Patented June 16, 1942

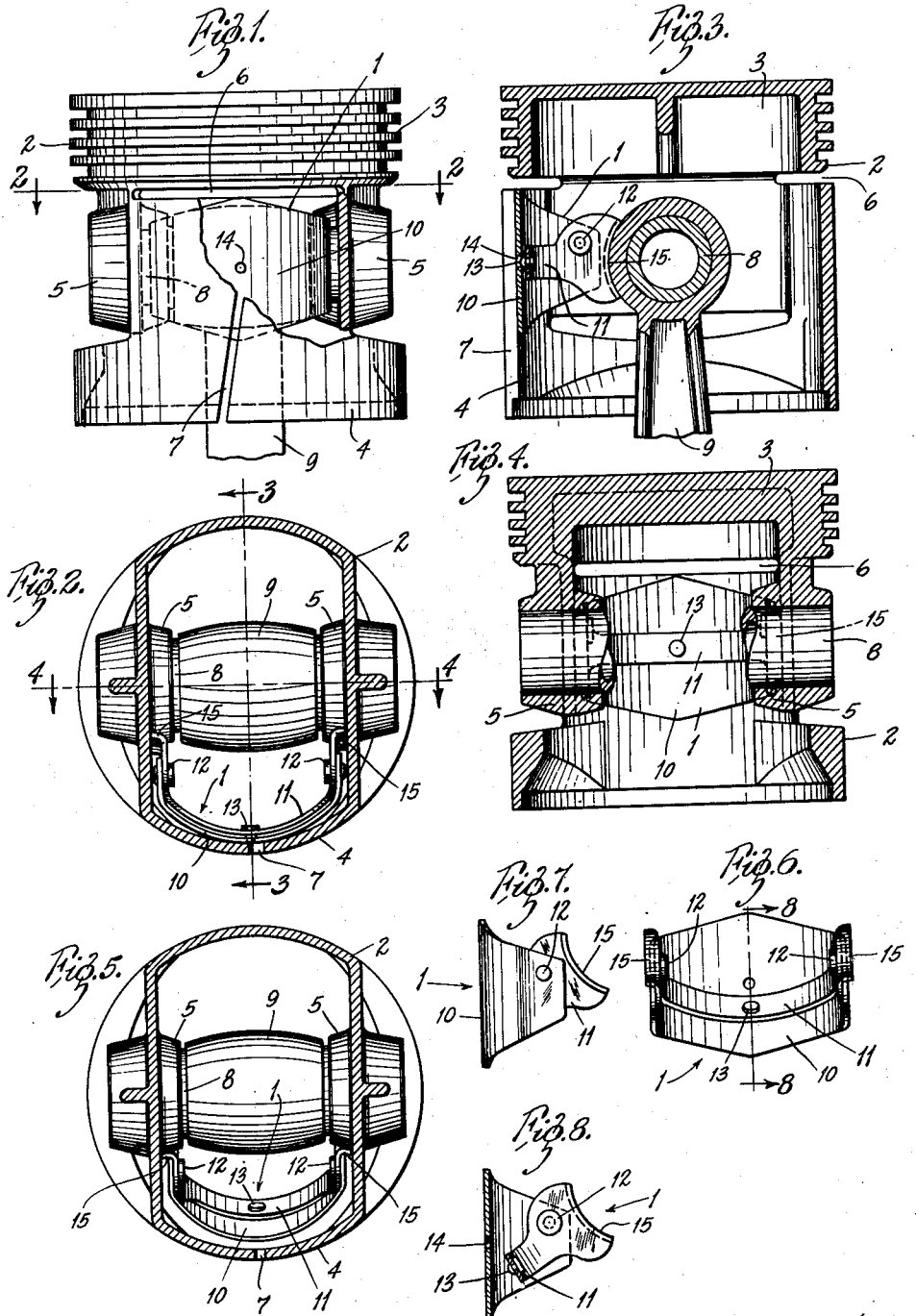

2,286,858

UNITED STATES PATENT OFFICE 2,286,858

PISTON EXPANDER

Walter C. Knoebel, Kirkwood, Mo., assignor to McQuay-Norris Manufacturing Company, St. Louis, Mo., a corporation of Delaware Application October 30, 1941, Serial No. 417,055

4 Claims. (Cl. 309—12)

My invention relates to piston expanders and more particularly to piston expanders adapted for use in either split skirt pistons or solid skirt pistons, to increase the piston diameter on the thrust surfaces in order to compensate for skirt collapse, skirt wear, or both.

My invention is directed particularly to a piston expander which may be inserted in a piston when the expander is collapsed without distorting the expander or piston and, after the expander is inserted in position in the piston, it may be moved into operative position so that an expansive force is exerted against the piston skirt by the expander.

In its broadest aspects, my invention contemplates a piston expander comprising a base part and a skirt engaging part. The base part is arranged eccentrically on the skirt engaging part whereby the expander may be inserted in the piston in collapsed position and an expansive force is exerted on the piston skirt when the parts are moved into operative position.

Having thus briefly described my invention, one object thereof is to provide a piston expander which may be inserted in a piston in collapsed position so that the expander is not distorted permanently during installation.

Another object of my invention is to provide a piston expander which expands the piston skirt without appreciably affecting alignment of the pin bosses.

A more specific object of my invention is to provide a piston expander which is cheap to manufacture and is efficient in operation.

Other objects and advantages will be apparent to those skilled in the art from the following description which relates to the drawing showing my invention and wherein like numerals designate like parts throughout the several views.

In the drawing,

Fig. 1 is an elevation of a piston with a portion thereof cut away showing an expander in operative position therein and constructed according to my invention.

Fig. 2 is a horizontal section on line 2—2 of Fig. 1.

Fig. 3 is a vertical section on line 3—3 of Fig. 2.

Fig. 4 is a vertical section on line 4—4 of Fig. 2.

Fig. 5 is a view similar to Fig. 2 but with the parts of the expander in collapsed position.

Fig. 6 is a front view of an expander constructed according to my invention in collapsed position for installation in a piston.

Fig. 7 is a side view thereof, and

Fig. 8 is a section on line 8—8 of Fig. 6.

Referring to the figures, an expander 1 constructed according to my invention is shown therein in connection with a piston 2 having a head 3 and a skirt 4. The skirt is separated from the head throughout a major portion of its periphery by a slot 6 and is split by an axially extending slot 7. The piston includes the usual pin bosses 5 to receive the wrist pin 8 upon which the connecting rod 9 is mounted.

The expander 1 comprises a skirt engaging part 10 of arcuate shape and substantially of the same contour as the inner surface of the piston skirt so that the part 10 engages the inner surface of the skirt throughout a substantially larger area. Attached pivotally to the skirt engaging part 10 is a base part 11 preferably having the ends thereof notched as at 15 so as to follow the contour of the bosses and adapted for engagement therewith. The expander is positioned operatively in the piston with the notched ends 15 of the base part 11 in engagement with the bosses and with the skirt engaging part 10 in engagement with the inner surface of the piston skirt at the axially extending slot 7 whereby the expander is maintained firmly in place. The pivotal connection between the base part 11 and the skirt engaging part 10 may take the form of rivets 12 or any other suitable arrangement may be used. The base part 11 is pivoted eccentrically on the skirt engaging part 10 in such manner so that when the base part and the skirt engaging part are in collapsed position as shown in Figs. 5, 6, 7, and 8 the distance between the portion of the skirt engaging part in engagement with the inner surface of the piston skirt and the notched ends 15 in engagement with the bosses is less than when the parts 10 and 11 are in operative position, as shown in Figs. 1, 2, 3, and 4.

Thus, the expander may be inserted in the piston in collapsed position without exerting any appreciable force on the expander to distort it and then the parts 10 and 11 may be moved to operative position, whereby an expansive force is exerted on the piston skirt. The base part 11 is arcuate in shape also and substantially follows the contour of the skirt engaging part 10. The base part 11 has a teat 13 thereon which is adapted to be positioned in registry with an opening 14 in the skirt engaging part 10 when the parts are in operative position in the piston to prevent relative movement of the parts after installation.

The expander preferably is made of spring steel although other materials suitable for expanders may be used.

The expander is installed in the piston and operates as follows: The expander in collapsed position, as shown in Figs. 6, 7, and 8, is inserted in the piston in the manner shown in Fig. 5 so that the skirt engaging part is in engagement with the inner surface of the skirt at the slot 7 therein and the notched ends 15 of the base part are in engagement with the wrist pin bosses 5 of the piston. A screw driver or other suitable tool may be used to move the expander into operative position by pushing the base part toward the piston head until the teat 13 thereon is positioned in registry with the opening 14 of the skirt engaging part. When the expander is positioned in the piston in this manner, an expansive force is exerted by the expander on the piston skirt to increase the diameter thereof.

A piston expander of this kind, as constructed according to my invention, expands the piston without appreciably affecting alignment of the pin bosses. Thus the diameter of the piston may be increased considerably to accommodate wear of the piston in use without binding or distorting the wrist pin. The expander may be inserted in the piston without springing or distorting the expander or the piston appreciably during installation because the expander is placed in the piston in collapsed position, and after it is inserted in the proper place in the piston it is moved into operative position as described above. Thus, the expander may exert its full expansive force on the piston and none of the energy of the expander is dissipated by distorting the expander when it is installed in the piston.

While I have shown and described one embodiment of my invention, it should be understood that other arrangements may be used also without departing from the scope of my invention as defined in the appended claims. For instance, while the expander shown and described herein is arranged so that the base part 11 engages the bosses 5, it may be necessary or expedient, in some types of pistons, to adapt the base part 11 for engagement with the wrist pin 8.

Also, although the drawing shows the expander in connection with a split skirt piston, the expander may be used effectively to compensate for skirt wear and skirt collapse with solid skirt pistons, that is, in pistons in which the skirt is not split axially.

What I claim as new and desire to secure by Letters Patent, is:

1. A piston expander comprising a base part and a skirt engaging part, said base part being attached pivotally to said skirt engaging part and being arranged eccentrically thereon to cause an expansive force to be exerted against said piston skirt when said parts are moved into operative position.

2. A piston expander comprising a base part and a skirt engaging part, said base part being attached pivotally to said skirt engaging part and being attached eccentrically thereto, said parts being arranged so that when said parts are moved into operative position an expansive force is exerted against said piston skirt, and means to lock said parts in operative position.

3. A piston expander comprising a base part adapted to engage the bosses of a piston and a skirt engaging part arranged to engage the inner surface of the piston skirt, said base part being attached pivotally to said skirt engaging part and being positioned eccentrically thereon, and said parts being arranged so that when said parts are moved into operative position an expansive force is exerted against said piston skirt.

4. A piston expander comprising a base part and a skirt engaging part, said skirt engaging part being adapted to engage the inner surface of the piston skirt and said base part being arranged to engage the pin bosses of the piston in which said expander is used, said base part being attached pivotally to said skirt engaging part and being arranged so that the distance between the portions of the skirt engaging part in engagement with the inner surface of the skirt and the portion of the base part in engagement with the bosses is less when said expander is in collapsed position than when said expander is in operative position in the piston.

WALTER C. KNOEBEL.